United States Patent
van der Lee et al.

(10) Patent No.: US 9,730,002 B2
(45) Date of Patent: Aug. 8, 2017

(54) MECHANICAL ENCLOSURES FOR A COMMUNICATION DEVICE

(71) Applicant: Avago Technologies General IP (Singapore) Pte. Ltd., Singapore (SG)

(72) Inventors: Reinierus van der Lee, Ranch Santa Margarita, CA (US); John Walley, Ladera Ranch, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/682,366

(22) Filed: Apr. 9, 2015

(65) Prior Publication Data
US 2015/0296328 A1    Oct. 15, 2015

Related U.S. Application Data

(60) Provisional application No. 61/978,143, filed on Apr. 10, 2014.

(51) Int. Cl.
*H04B 5/00* (2006.01)
*H04W 4/00* (2009.01)
*H04B 1/3888* (2015.01)
*H04L 29/08* (2006.01)

(52) U.S. Cl.
CPC .......... *H04W 4/008* (2013.01); *H04B 1/3888* (2013.01); *H04B 5/0031* (2013.01); *H04B 5/0037* (2013.01); *H04L 67/12* (2013.01)

(58) Field of Classification Search
CPC ... H04W 4/008; H04B 5/0031; H04B 5/0037; H04L 67/12
USPC ................... 455/41.1, 41.2, 41.3, 78, 73, 83
See application file for complete search history.

(56) References Cited

U.S. PATENT DOCUMENTS

| | | | | |
|---|---|---|---|---|
| 5,360,941 A | * | 11/1994 | Roes ............... | G06K 19/07327 174/378 |
| 6,208,876 B1 | * | 3/2001 | Raussi .................... | H04M 1/67 455/550.1 |
| 8,188,744 B2 | * | 5/2012 | Lee ....................... | G01R 33/341 324/319 |
| 8,811,894 B2 | * | 8/2014 | Cordier ............ | G06K 19/07769 455/41.1 |
| 9,287,915 B2 | * | 3/2016 | Wong .................... | H01Q 1/243 |
| 2002/0077710 A1 | * | 6/2002 | Harrington ............ | G01V 15/00 700/13 |
| 2004/0119701 A1 | * | 6/2004 | Mulligan ................ | G06F 3/044 345/173 |

(Continued)

*Primary Examiner* — Md Talukder
(74) *Attorney, Agent, or Firm* — Sterne, Kessler, Goldstein & Fox P.L.L.C.

(57) ABSTRACT

The present disclosure describes a mechanical chassis having one or more conductive regions separated by one or more non-conductive regions. When a magnetic field contacts, or is sufficiently proximate to, this communication device, the magnetic field induces one or more eddy currents that flow in one or more closed loops around a surface of the one or more conductive regions. The one or more non-conductive regions confine the one or more eddy currents to the one or more conductive regions. The magnetic fields generated by these one or more eddy currents are weaker than a magnetic field generated by eddy currents in a communication device having a mechanical chassis constructed entirely of conductive material.

16 Claims, 8 Drawing Sheets

(56) References Cited

U.S. PATENT DOCUMENTS

| | | | |
|---|---|---|---|
| 2010/0234081 A1* | 9/2010 | Wong | H01Q 1/243 455/575.5 |
| 2012/0071088 A1* | 3/2012 | Cordier | G06K 19/07771 455/41.1 |
| 2012/0309472 A1* | 12/2012 | Wong | H01Q 1/243 455/575.5 |
| 2013/0056257 A1* | 3/2013 | Chua | H05K 9/0088 174/388 |
| 2013/0190052 A1* | 7/2013 | Lundell | H04M 1/0262 455/566 |
| 2014/0057686 A1* | 2/2014 | McCaughey | H04B 1/3838 455/575.5 |
| 2014/0287697 A1* | 9/2014 | Wong | H01Q 1/243 455/73 |
| 2015/0048752 A1* | 2/2015 | Van Den Brink | H02J 5/005 315/246 |
| 2015/0107891 A1* | 4/2015 | Haynes | H01F 27/362 174/359 |
| 2015/0296328 A1* | 10/2015 | van der Lee | H04B 1/3888 455/41.1 |
| 2016/0111889 A1* | 4/2016 | Jeong | H02J 5/005 320/108 |

* cited by examiner

MECHANICAL ENCLOSURES FOR A COMMUNICATION DEVICE

CROSS-REFERENCE TO RELATED APPLICATIONS

The present application claims the benefit of U.S. Provisional Patent Appl. No. 61/978,143, filed Apr. 10, 2014, which is incorporated herein by reference in its entirety.

BACKGROUND

Field of Disclosure

The present disclosure generally relates to a communication device and including a mechanical chassis of the communication device.

Related Art

The continued improvement of semiconductor fabrication processes has allowed manufacturers and designers to create a smaller and a more powerful electronic device. This smaller and more powerful electronic device is being integrated with near field communication (NFC) technology to facilitate the use of this electronic device in conducting daily transactions. For example, instead of carrying numerous credit cards, the credit information provided by these credit cards can be loaded and stored onto an NFC enabled device to be used as needed. The NFC enabled device is simply tapped to a credit card terminal to relay the credit information to complete a transaction. As another example, a ticket writing system, such as those used in bus and train terminals, may simply write ticket fare information onto the NFC enabled device instead of providing a paper ticket to a passenger. The passenger simply taps the NFC enabled device to a reader to ride the bus or the train without using a traditional the paper ticket.

Furthermore, this smaller and more powerful electronic device is being integrated with wireless power transfer (WPT) capabilities to allow this device to wirelessly charge its internal batteries from a wireless power source without the use of a wired connection. In near-field or non-radiative WPT techniques, power is transferred over short distances by magnetic fields using inductive coupling between coils of wire. These techniques rely on the use of a magnetic field generated by a transmitter device to induce a current in the electronic device. This effect occurs in the electromagnetic near field, with the electronic device in close proximity to the transmitter device.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 7A:
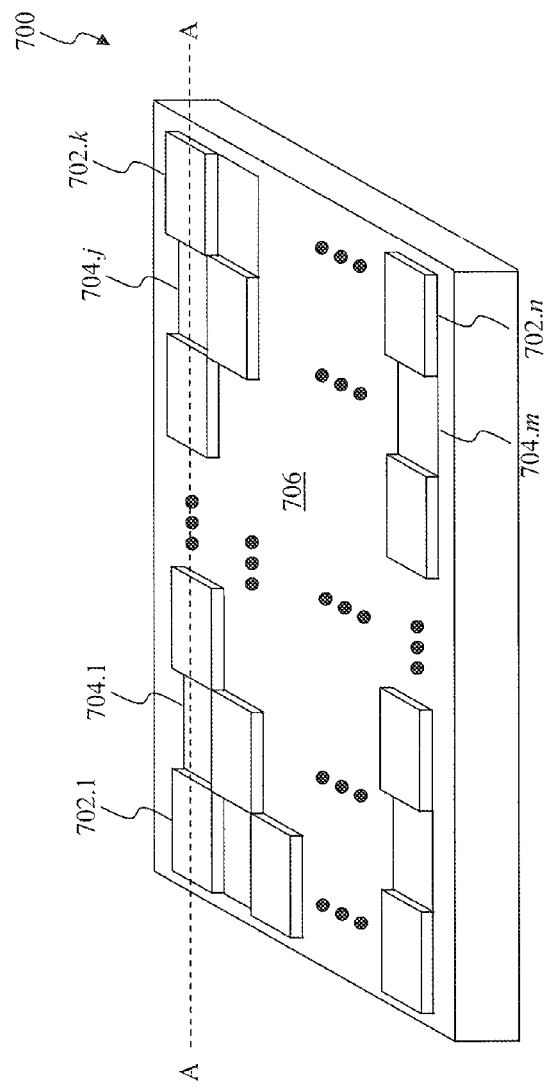
FIG. 7A illustrates an exemplary bottom enclosure having a first group of conductive regions adjacent to a second group of conductive regions according to an exemplary embodiment of the present disclosure.
Figure 7B:
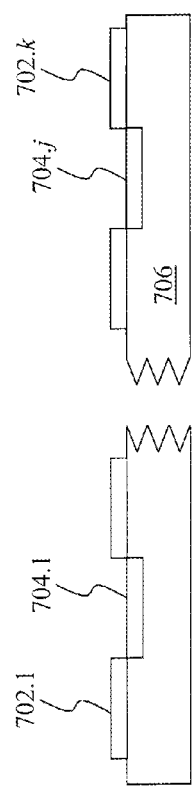
Figure 8:
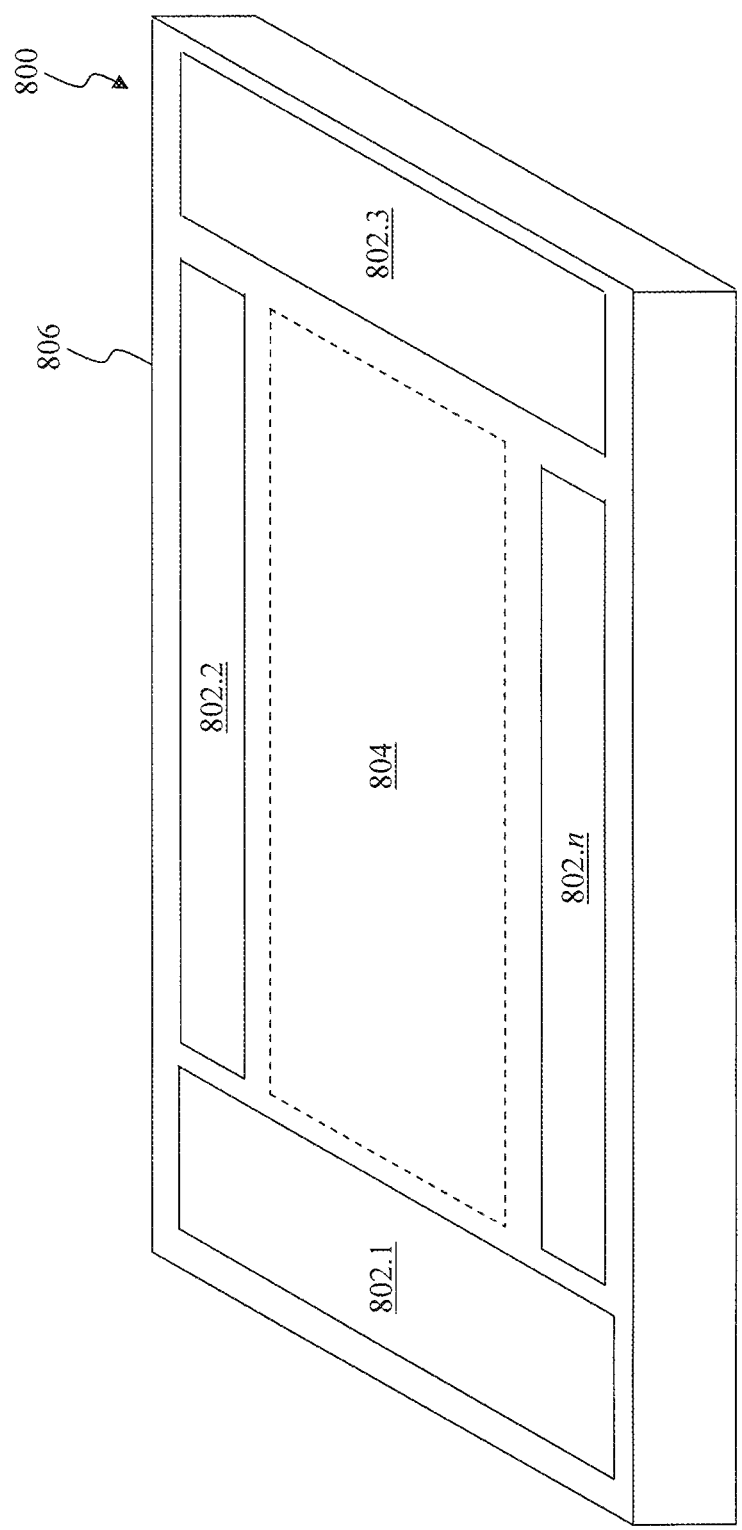

FIG. 7B further illustrates the exemplary bottom enclosure according to an exemplary embodiment of the present disclosure; and FIG. 8 illustrates an exemplary bottom enclosure having an integrated antenna according to an exemplary embodiment of the present disclosure

DETAILED DESCRIPTION OF THE DISCLOSURE

Overview

A communication device of the present disclosure includes a mechanical chassis having one or more conductive regions separated by one or more non-conductive regions. When a magnetic field contacts, or is sufficiently proximate to, this communication device, the magnetic field induces one or more eddy currents that flow in one or more closed loops around a surface of the one or more conductive regions. The one or more non-conductive regions confine the one or more eddy currents to the one or more conductive regions. The magnetic fields generated by these one or more eddy currents are weaker than a magnetic field generated by eddy currents in a communication device having a mechanical chassis constructed entirely of conductive material.

An Exemplary Communication Device

Figure 1:
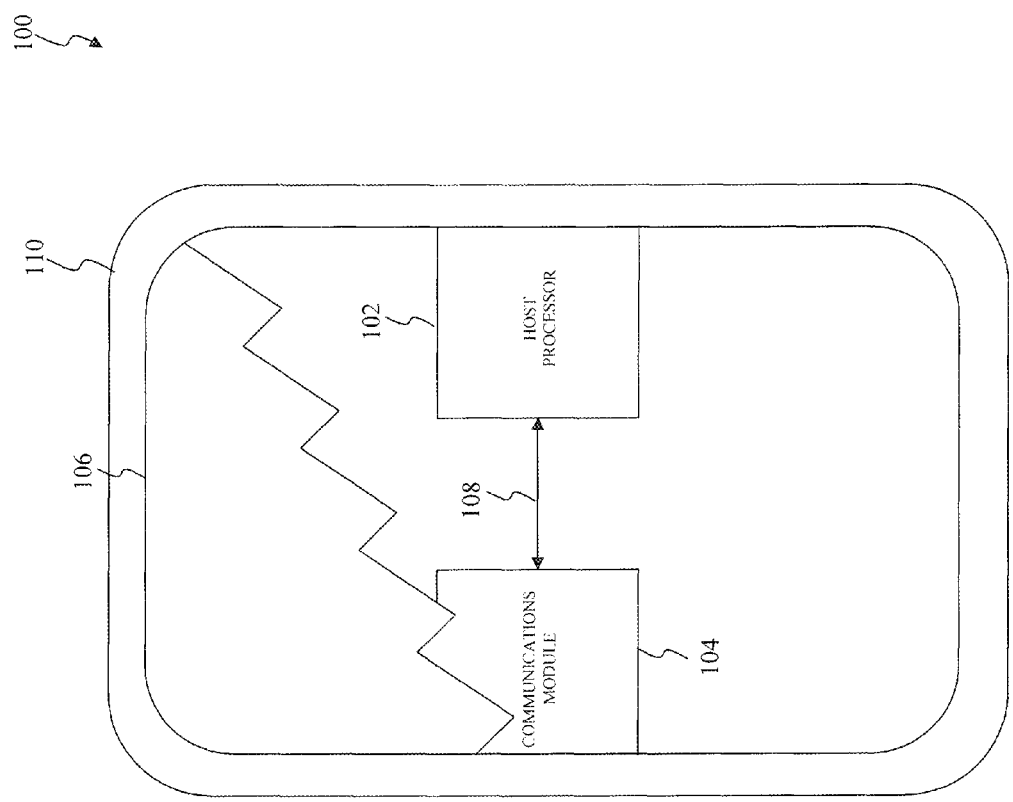
FIG. 1 illustrates a block diagram of a communication device according to an exemplary embodiment of the disclosure.

FIG. 1 illustrates a block diagram of a communication device according to an exemplary embodiment of the disclosure. The communication device 100 can represent an all-in-one computer, a tablet computer, a mobile phone, a personal digital assistant (PDA), a satellite navigation device, video gaming device, a kiosk system in retail and tourist settings, a point of sale system, an automatic teller machine (ATM), an electronic accessory such as a smart watch, or any other suitable communication device that will be apparent to those skilled in the relevant art(s) without departing from the spirit and scope of the present disclosure. As illustrated in FIG. 1, the communication device 100 can include a host processor 102, a communication module 104, and a touch-screen display 106 that are communicatively coupled via a communication interface 108. References in the disclosure to a "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

The host processor 102 controls overall operation and/or configuration of the communication device 100. The host processor 102 can receive and/or process information from a user interface such as an alphanumeric keypad, a microphone, a mouse, a speaker, and/or from other electrical devices or host devices that are coupled to the communication device 100. The host processor 102 can provide this information to the communication module 104 and/or the touch-screen display 106. Additionally, the host processor 102 can receive and/or process information from the communication module 104 and/or the touch-screen display 106. The host processor 102 can provide this information to the communication module 104 and/or the touch-screen display 106 and/or to other electrical devices or host devices. Further, the host processor 102 can execute one or more applications such as Short Message Service (SMS) for text messaging, electronic mailing, and/or audio and/or video recording to provide some examples, and/or software applications such as a calendar and/or a phone book to provide some examples.

The communication module 104 provides voice or data communication for a user of the communication device 100. The communication module 104 can include one or more of: a Bluetooth module, a Global Position System (GPS) module, a cellular module, a wireless local area network (WLAN) module, a near field communication (NFC) module, a radio frequency identification (RFID) module and/or a wireless power transfer (WPT) module. The Bluetooth module, the cellular module, the WLAN module, the NFC module, and the RFID module provide wireless communication between the communication device 100 and other Bluetooth, other cellular, other WLAN, other NFC, and other RFID enabled communication devices, respectively, in accordance with various communication standards or protocols. These various communication standards or protocols can include various cellular communication standards such as a third Generation Partnership Project (3GPP) Long Term Evolution (LTE) communication standard, a fourth generation (4G) mobile communication standard, or a third generation (3G) mobile communication standard, various networking protocols such a Wi-Fi communication standard, various NFC/RFID communication protocols such as ISO 1422, ISO/IEC 14443, ISO/IEC 15693, ISO/IEC 18000, or FeliCa to provide some examples. The GPS module receives various signals from various satellites to determine location information for the communication device 100. The WPT module supports wireless transmission of power between the communication device 100 and another WPT enabled communication device.

Each of the Bluetooth module, the cellular module, the WLAN module, the NFC module, and/or the RFID module can include a transmitter, a receiver, along with one or more processors, circuitry, and/or logic configured to transmit and/or receive wireless communications via one or more antennas. Those skilled in the relevant art(s) will recognize that the transmitter and/or the receiver can include, but is not limited to, a digital signal processor (DSP), modulator and/or demodulator, a digital-to-analog converter (DAC), an analog-to-digital converter (ADC), and/or one or more frequency converters, such as one or more mixers, one or more local oscillators, and/or one or more filters to provide some examples.

The touch-screen display 106 provides a graphical user interface for the user of the communication device 100. The touch-screen display 106 operates as an output device to provide images relating to the voice or the data communication and/or the one or more applications to the user of the communication device 100. The touch-screen display 106 also operates as an input device to receive one or more commands and/or data from the user of the communication device 100 for the voice or data communication and/or the one or more applications.

The communication interface 108 routes various communications between the host processor 102, the communication module 104, and the touch-screen display 106. The communication interface 108 can be implemented as a series of wired and/or wireless interconnections between the host processor 102, the communication module 104, and the touch-screen display 106. The interconnections of the communication interface 108 can be arranged to form a parallel interface to route communication between the host processor 102, the communication module 104, and the touch-screen display 106 in parallel, or a serial interface to route communication between the host processor 102, the communication module 104, and the touch-screen display 106, or any combination thereof.

As further illustrated in FIG. 1, the host processor 102, the communication module 104, the touch-screen display 106, and the communication interface 108 are contained within, or supported by, a mechanical chassis 110 of the communication device 100. Consumers often desire to have the mechanical chassis 110 be completely fabricated using a conductive material, such as aluminum, copper, zinc, gold, tin, and/or silver to provide some examples, for its appearance and durability. However, the mechanical chassis 110 can interfere and/or distort communication signals traveling between the communication device 100 and other communication devices especially when magnetic fields are used for by these devices for communication and/or transferring power.

Conventional Communication Device

Figure 2:
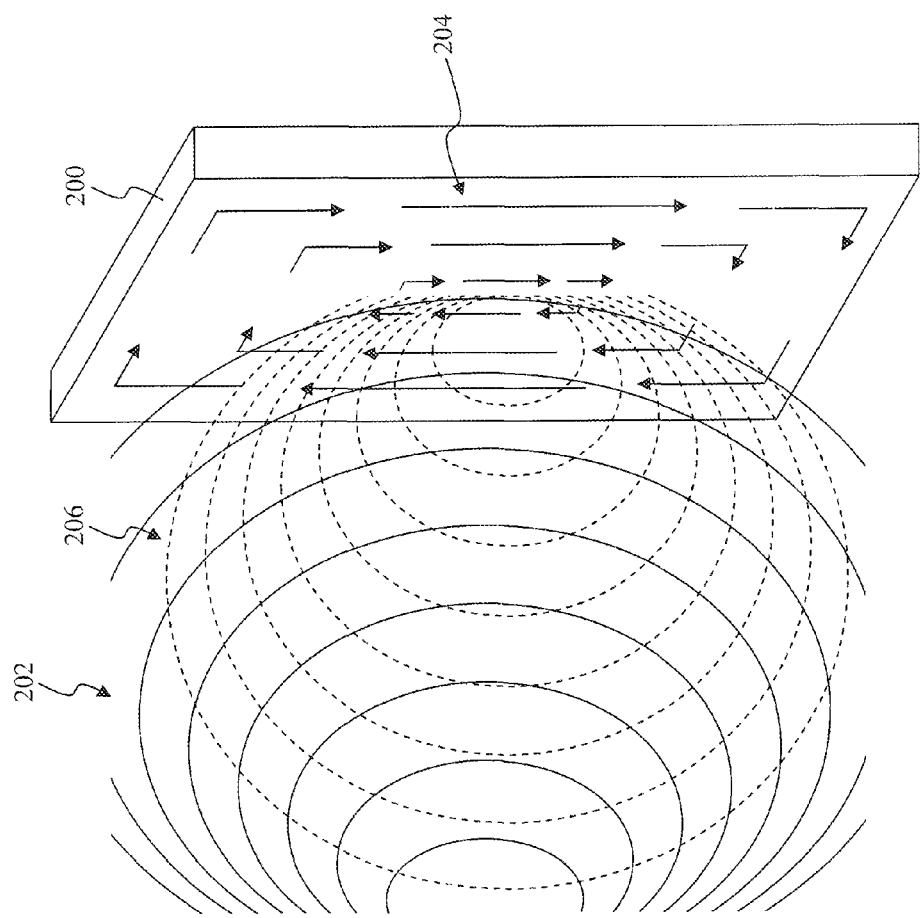
FIG. 2 illustrates operation of a conventional communication device which utilizes magnetic fields for communication and/or transferring power.

FIG. 2 illustrates operation of a conventional communication device which utilizes magnetic fields for communication and/or transferring power. As illustrated in FIG. 2, a conventional communication device 200 communicates with another communication device (not shown in FIG. 2) using a magnetic field 202. For example, the magnetic field 202 can be used by the conventional communication device 200 to communicate information between the conventional communication device 200 and this other communication device. In this example, the conventional communication device 200 can communicate information to this other communication device by modulating the information onto the magnetic field 202 and can recover information from this other communication device by demodulating the magnetic field 202. Additionally, the magnetic field 202 can be used by the conventional communication device 200 to derive and/or harvest power to permit its operation. For example, the conventional communication device 200 can charge a charge storing element, such as a capacitor or a battery to provide some examples, using the magnetic field 202.

As further illustrated in FIG. 2, when the magnetic field 202 contacts, or is sufficiently proximate to, the conventional communication device 200, the magnetic field 202 induces one or more eddy currents 204 that flow in one or more closed loops around a surface of the conventional communication device 200. The one or more eddy currents 204 collectively generate a magnetic field 206 which can interfere and/or distort the magnetic field 202. For example, the magnetic field 206 can destructively interfere with the magnetic field 202 which can result in a degradation of the magnetic field 202. This can diminish a capability of the conventional communication device 200 to communicate with another communication device and/or to derive and/or harvest power from the magnetic field 202.

Exemplary Mechanical Chassis of the Communication Device

A communication device of the present disclosure, such as the communication device 100 to provide an example, includes a mechanical chassis having one or more conductive regions separated by one or more non-conductive regions. When a magnetic field contacts, or is sufficiently proximate to, this communication device, the magnetic field induces one or more eddy currents that flow in one or more closed loops around a surface of the one or more conductive regions. The one or more non-conductive regions confine the one or more eddy currents to the one or more conductive regions. The magnetic fields generated by these one or more eddy currents are weaker than the magnetic field 206 as illustrated in FIG. 2.

Figure 3:
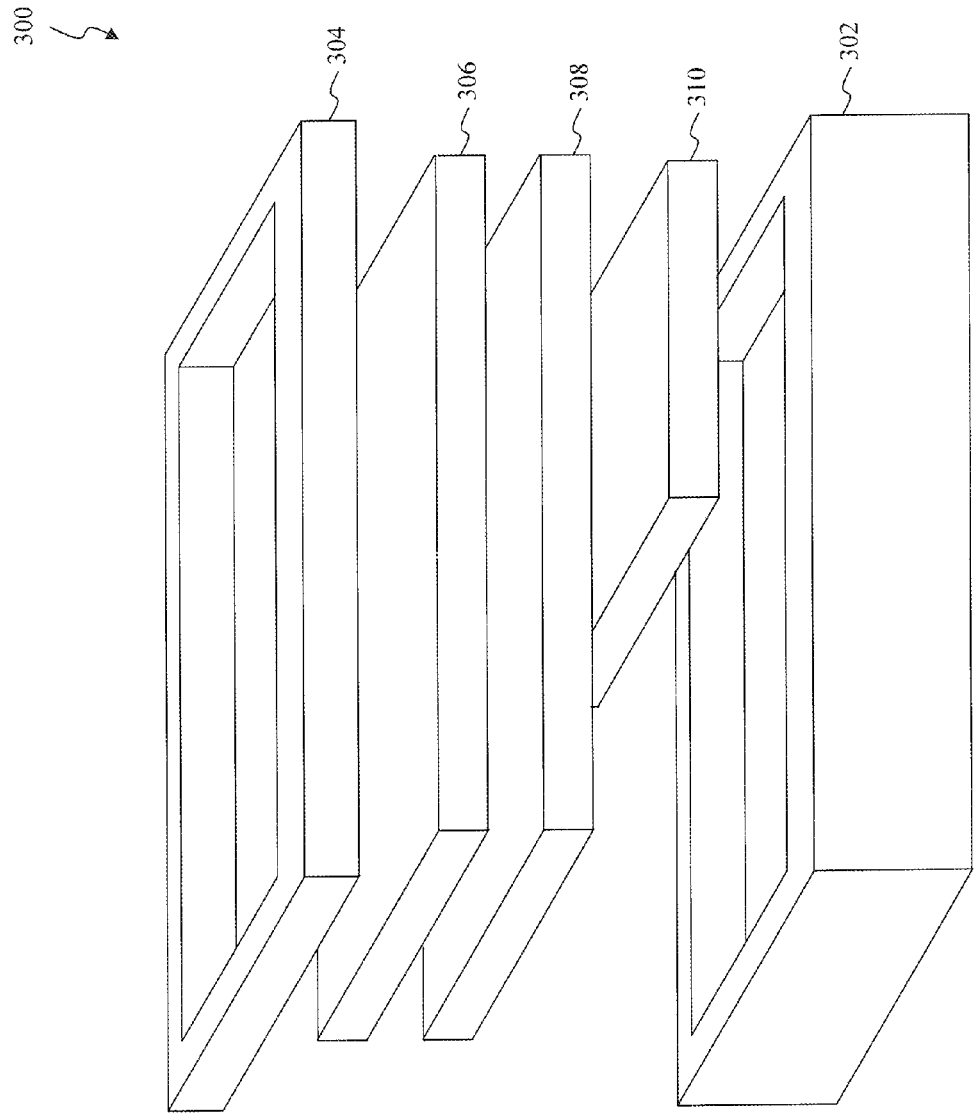
FIG. 3 illustrates an exemplary mechanical chassis of the communication device according to an exemplary embodiment of the disclosure.

FIG. 3 illustrates an exemplary mechanical chassis of the communication device according to an exemplary embodiment of the disclosure. A mechanical chassis 300 represents a frame or a housing containing or supporting electrical, mechanical, and/or electro-mechanical components of a communication device, such as the communication device 100 to provide an example. The mechanical chassis 300 includes a first enclosure 302 that is attached to a second enclosure 304. However, those skilled in the relevant art(s) will recognize that other configurations and arrangements are possible without departing from the spirit and scope of the present disclosure. For example, the mechanical chassis 300 can include one or more other mechanical bottom enclosures for attaching the first enclosure 302 and/or the second enclosure 304 thereto.

The mechanical chassis 300 includes a bottom enclosure, represented as a first enclosure 302 in FIG. 3, which is coupled to the second enclosure 304. The first enclosure 302 is attached to the second enclosure 304 to contain a touch-screen display 306, such as the touch-screen display 106 to provide an example, one or more semiconductor substrates and/or printed circuit boards 308, and a battery 210 of the communication device. In an exemplary embodiment, the one or more semiconductor substrates and/or printed circuit boards 308 includes one or more semiconductor substrates and/or one or more printed circuit boards having a host processor, such as the host processor 102 to provide an example, and/or a communication module, such as the communication module 104 to provide an example, of the communication device. In some situations, various other electrical, mechanical, and/or electro-mechanical components of the communication device, such as a digital camera, an input/output device, a microphone, and/or a speaker to provide some examples, can be contained within, or supported by, the first enclosure 302. Although not illustrated in FIG. 3, the first enclosure 302 can include one or more openings for these other electrical, mechanical and/or electro-mechanical components. Often times, the touch-screen display 306, the one or more semiconductor substrates and/or printed circuit boards 308, and/or these other electrical, mechanical, and/or electro-mechanical components of the communication device can be coupled together using one or more flexible flat cables (FFCs) though other couplings are possible that will be apparent to those skilled in the relevant art(s).

The first enclosure 302 includes one or more conductive regions separated by one or more non-conductive regions. The one or more conductive regions, as well as various other conductive regions described herein, can be constructed of one or more elements, compounds, or alloys of one or more metals, such as aluminum, copper, zinc, gold, tin, and/or silver to provide some examples. The one or more non-conductive regions, as well as various other non-conductive regions described herein, can be constructed of one or more synthetic or semi-synthetic organic compounds or materials, also referred to as plastic, to provide an example. However, any suitable material capable of conduction can be used for the one or more conductive regions and/or suitable material incapable, or relatively incapable, of conduction can be used for the one or more non-conductive regions which will be apparent to those skilled in the relevant art(s). In some situations, a semi-conductive material can be used for either the one or more conductive regions and/or one or more non-conductive regions. In an exemplary embodiment, the first enclosure 302 is formed using the one or more synthetic or semi-synthetic organic compounds or materials. In this exemplary embodiment, the one or more synthetic or semi-synthetic organic compounds or materials are etched and filled with one or more elements, compounds, or alloys of one or more metals to form the one or more conductive regions. Alternatively, the one or more elements, compounds, or alloys of one or more metals used to form the one or more conductive regions can be formed onto the one or more synthetic or semi-synthetic organic compounds or materials and secured in place by applying a layer of natural or synthetic resin, such as epoxy resin to provide an example, onto the one or more synthetic or semi-synthetic organic compounds or materials to secure the one or more conductive regions to the one or more non-conductive regions.

The one or more conductive regions can be implemented as one or more regular closed geometric structures, such as one or more regular polygons to provide an example, one or more irregular closed structures, such as one or more irregular polygons to provide an example, and/or any suitable combination of these closed structures that will be apparent to those skilled in the relevant art(s). In an exemplary embodiment, the one or more conductive regions can be configured and arranged to form a tuned circuit. This tuned circuit can be optimally tuned to resonate at a frequency of a magnetic field. As such, the tuned circuit can amplify the magnetic field when the magnetic field contacts, or is sufficiently proximate to, the first enclosure 302. In another exemplary embodiment, the one or more conductive regions and/or the one or more non-conductive regions can be of sufficient size and shape to give an appearance that the first enclosure 302 is constructed entirely of conductive material.

The mechanical chassis 300 further includes a top enclosure, represented as the second enclosure 304 in FIG. 3, which is coupled to the first enclosure 302. The second enclosure 304 is attached to the first enclosure 302 to contain the touch-screen display 306 and/or the one or more semiconductor substrates and/or printed circuit boards 308, a battery 310, the other electrical, mechanical, and/or electromechanical components of the communication device as well as the one or more flexible flat cables (FFCs) within the communication device. Although not illustrated in FIG. 3, the second enclosure 304 can include one or more openings for the other electrical, mechanical, and/or electro-mechanical components, such as the digital camera, the input/output device, the microphone, and/or the speaker to provide some examples.

Although the mechanical chassis 300 includes the first enclosure 302 and the second enclosure 304, this is for illustrative purposes only. Other configurations and arrangements for the mechanical chassis 300 are possible that will be apparent to those skilled in the relevant art(s). For example, the first enclosure 302 and/or the second enclosure 304 can include multiple first bottom enclosures 302, and/or second bottom enclosures 304 having different sizes and/or shapes than as illustrated to form the foundation for assembling the electrical, the mechanical, and/or the electro-mechanical components of the communication device. As another example, the first enclosure 302 and/or the second enclosure 304 are formed into rectangular shapes as illustrated in. FIG. 3. However, those skilled in the relevant art(s) will recognize the first enclosure 302 and/or the second enclosure 304 may be formed into other geometric shapes without departing from the spirit and scope of the present disclosure. These other geometric shapes may include regular or irregular polygons and/or closed curves to provide some examples.

Still further, in another embodiment, the mechanical chassis 300 need not include the second enclosure 304. In this embodiment, the touchscreen 306 is attached, or molded, to the first enclosure 302 using an appropriate adhesive or other attachment mechanism. In this embodiment, the touchscreen 306 forms the top surface of the mechanical chassis 300, and the first enclosure 302 includes or forms the bottom surface of the mechanical chassis 300.

Figure 4:
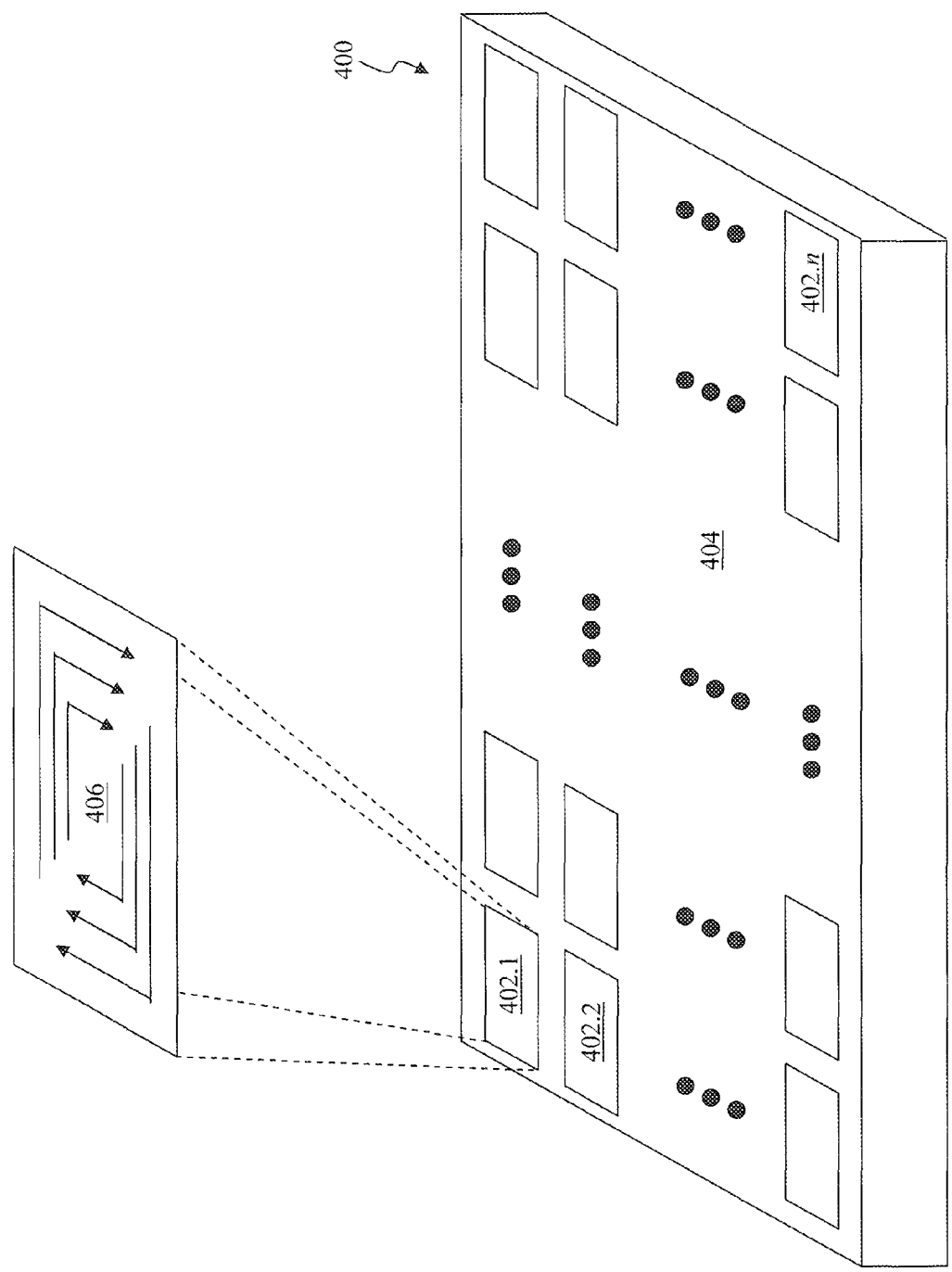
FIG. 4 illustrates a first exemplary bottom enclosure having one or more conductive regions separated by a non-conductive region according to an exemplary embodiment of the present disclosure.

Exemplary Bottom Enclosures Having One or More Conductive Regions Separated by a Non-Conductive Region FIG. 4 illustrates an exemplary bottom enclosure having one or more conductive regions separated by a non-conductive region according to an exemplary embodiment of the present disclosure. As illustrated in FIG. 4, a bottom enclosure 400 includes conductive regions 402.1 through 402.$n$ that are formed onto and/or within a non-conductive region 404. The bottom enclosure 400 can represent an exemplary embodiment of the first enclosure 302.

As illustrated in FIG. 4, the conductive regions 402.1 through 402.$n$ are configured to be regular closed geometric structures, such as rectangles to provide an example. However, the conductive regions 402.1 through 402.$n$ can be implemented using other regular closed geometric structures, one or more irregular closed structures, such as one or more irregular polygons to provide an example, and/or any suitable combination of closed structures that will be apparent to those skilled in the relevant art(s). Although the conductive regions 402.1 through 402.$n$ as illustrated in FIG. 4 have substantially similar dimensions, those skilled in the relevant art(s) will recognize that other dimensions, whether similar or dissimilar, are possible.

As additionally illustrated in FIG. 4, the conductive regions 402.1 through 402.$n$ are arranged in a series of rows and columns to form a matrix. The non-conductive region 404 separates the conductive regions 402.1 through 402.$n$ to be non-overlapping with each other in the matrix. In an exemplary embodiment, the conductive regions 402.1 through 402.$n$ are interdigitated with the non-conductive region 404. The separation between the conductive regions 402.1 through 402.$n$ can be similar and/or dissimilar among pairs of the conductive regions 402.1 through 402.$n$. In another exemplary embodiment, the separation between the conductive regions 402.1 through 402.$n$ and the area of the conductive regions 402.1 through 402.$n$ can be selectively chosen to form a capacitor. One or more of these capacitors can be configured and arranged to form a tuned circuit or a portion thereof. This tuned circuit can be optimally tuned to resonate at a frequency of a magnetic field. As such, the tuned circuit can amplify a magnetic field when the magnetic field contacts, or is sufficiently proximate to, the bottom enclosure 400.

As further illustrated in FIG. 4, when a magnetic field contacts, or is sufficiently proximate to, the bottom enclosure 400, the magnetic field induces one or more eddy currents 406 that flow in one or more closed loops around surfaces of the conductive regions 402.1 through 402.$n$. The non-conductive region 404 confines the one or more eddy currents 406 to the conductive regions 402.1 through 402.$n$. The magnetic fields generated by the one or more eddy currents 406 are weaker than a magnetic field generated by eddy currents in a bottom enclosure constructed entirely of conductive material.

Figure 5B:
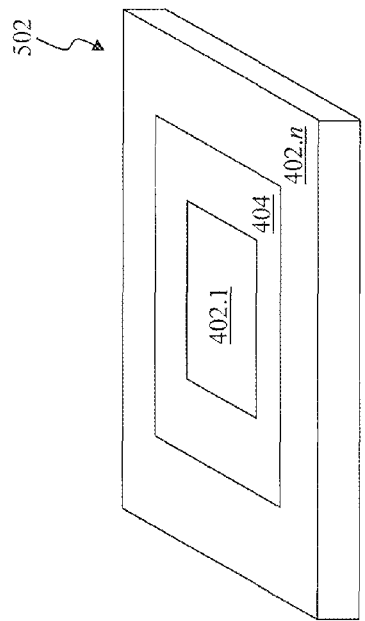
FIG. 5B illustrates a third exemplary bottom enclosure having one or more conductive regions separated by a non-conductive region according to an exemplary embodiment of the present disclosure.
Figure 5D:
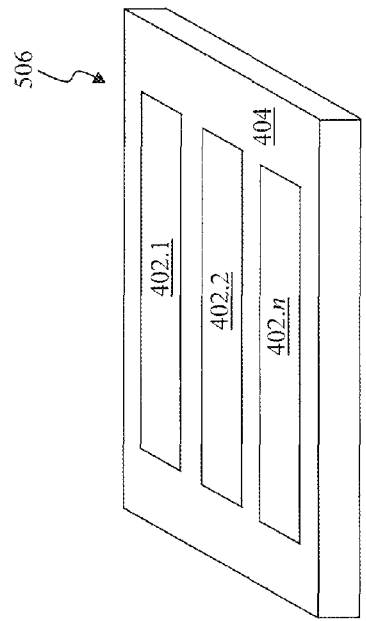
FIG. 5D illustrates a fifth exemplary bottom enclosure having one or more conductive regions separated by a non-conductive region according to an exemplary embodiment of the present disclosure.
Figure 5A:
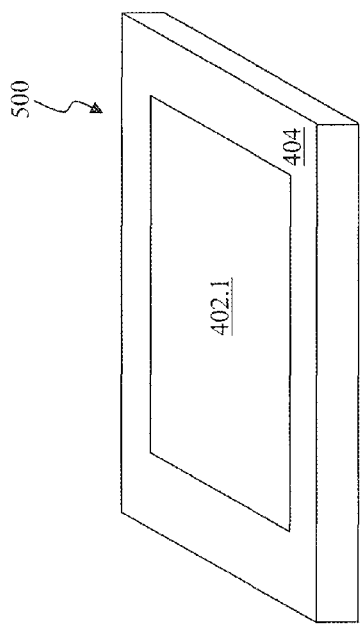
FIG. 5A illustrates a second exemplary bottom enclosure having one or more conductive regions separated by a non-conductive region according to an exemplary embodiment of the present disclosure.
Figure 5C:
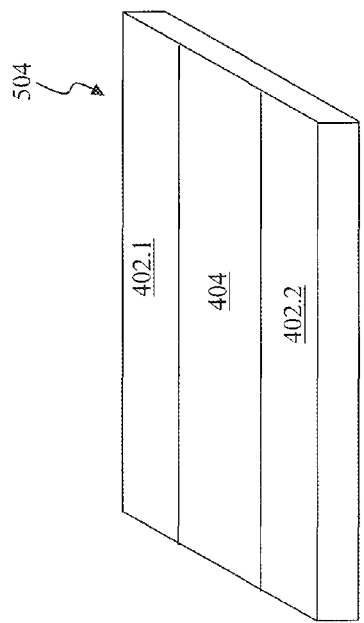
FIG. 5C illustrates a fourth exemplary bottom enclosure having one or more conductive regions separated by a non-conductive region according to an exemplary embodiment of the present disclosure.

Those skilled in the relevant art(s) will recognize that other configurations and arrangements of conductive regions and/or non-conductive regions are possible. For example, a bottom enclosure 500 includes a conductive region 402.1 that is formed onto and/or within the non-conductive region 404 as illustrated in FIG. 5A. In this example, the conductive region 402.1 is centric to the bottom enclosure 500. However, those skilled in the relevant arts will recognize that the conductive region 402.1 can be non-centric to the bottom enclosure 500 without departing from the spirit and scope of the present disclosure. As another example, a bottom enclosure 502 includes conductive regions 402.1 through 402.$n$ that are formed onto and/or within the non-conductive region 404 as illustrated in FIG. 5B. In this other example, the conductive regions 402.1 through 402.$n$ are concentric to each other and separated from each other by the non-conductive region 404. As a further example, a bottom enclosure 504 includes conductive regions 402.1 and 402.2 that are formed onto and/or within the non-conductive region 404 as illustrated in FIG. 5C. In this further example, the conductive regions 402.1 and 402.2 are formed onto and/or within opposite sides of the bottom enclosure 504 and separated from each other by the non-conductive region 404. As a yet further example, a bottom enclosure 506 includes conductive regions 402.1 and 402.$n$ that are formed onto and/or within the non-conductive region 404 as illustrated in FIG. 5D. In this yet further example, the conductive regions 402.1 and 402.$n$ are arranged in a series of rows and separated from each other by the non-conductive region 404. Each of the bottom enclosures 500 through 506 can represent an exemplary embodiment of the first enclosure 302.

Figure 6:
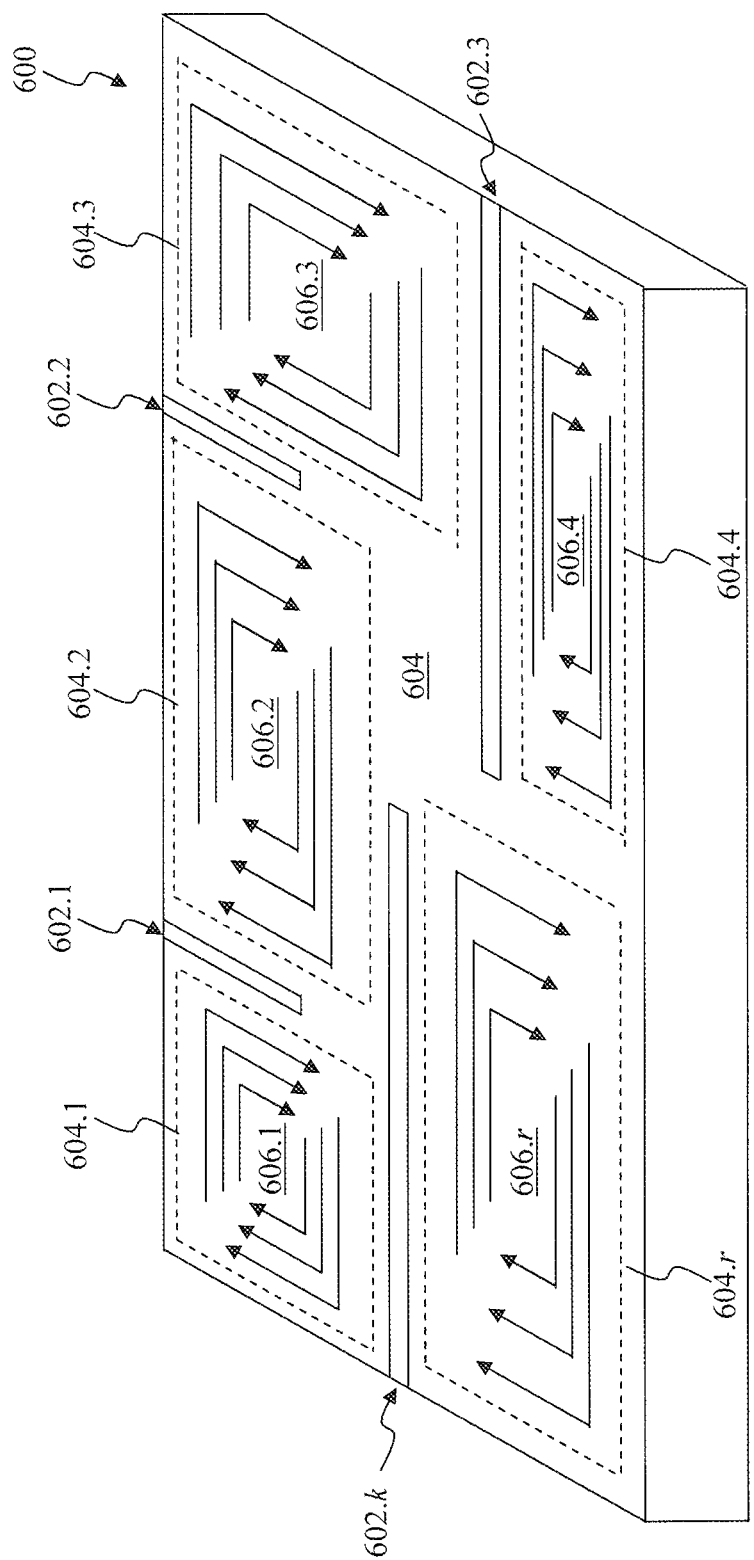
FIG. 6 illustrates an exemplary bottom enclosure having a conductive region separated by one or more non-conductive regions according to an exemplary embodiment of the present disclosure.

Exemplary Bottom Enclosures Having a Conductive Region Separated by One or More Non-Conductive Region FIG. 6 illustrates an exemplary bottom enclosure having a conductive region separated by one or more non-conductive regions according to an exemplary embodiment of the present disclosure. As illustrated in FIG. 6, a bottom enclosure 600 includes non-conductive, non-connected regions 602A through 602.$k$ that are formed onto and/or within a conductive region 604. The bottom enclosure 600 can represent an exemplary embodiment of the first enclosure 302.

As illustrated in FIG. 6, the non-conductive, non-connected regions 602.1 through 602.k are configured to be regular closed geometric structures, such as rectangles to provide an example. However, the non-conductive, non-connected 602.1 through 602.k can be implemented using other regular closed geometric structures, one or more irregular closed structures, such as one or more irregular polygons to provide an example, and/or any suitable combination of closed structures that will be apparent to those skilled in the relevant art(s). Although some of the non-conductive, non-connected 602.1 through 602.k as illustrated in FIG. 6 have substantially similar dimensions, those skilled in the relevant art(s) will recognize that other dimensions, whether similar or dissimilar, are possible.

As additionally illustrated in FIG. 6, the non-conductive, non-connected regions 602.1 through 602.k are arranged throughout the bottom enclosure 600 to separate the conductive region 604 into multiple, interconnected conductive sub-regions 604.1 through 604.r. The multiple, interconnected conductive sub-regions 604.1 through 604.r are configured to be regular closed geometric structures, such as rectangles to provide an example. However, the multiple, interconnected conductive sub-regions 604.1 through 604.r can be implemented using other regular closed geometric structures, one or more irregular closed structures, such as one or more irregular polygons to provide an example, and/or any suitable combination of closed structures that will be apparent to those skilled in the relevant art(s). Additionally, the multiple conductive sub-regions 604.1 through 604.r can be similar and/or dissimilar to one another.

As further illustrated in FIG. 6, when a magnetic field contacts, or is sufficiently proximate to, the bottom enclosure 600, the magnetic field induces one or more eddy currents 606.1 through 606.r that flow in one or more closed loops around surfaces of the multiple, interconnected sub-regions 604.1 through 604.r. The non-conductive, non-connected regions 602.1 through 602.k confine the one or more eddy currents 606.1 through 606.r to their respective multiple, interconnected conductive sub-regions 604.1 through 604.r. The magnetic fields generated by the one or more eddy currents 606.1 through 606.r are weaker than a magnetic field generated by eddy currents in a bottom enclosure constructed entirely of conductive material.

Other Exemplary Bottom Enclosures

FIG. 7A illustrates an exemplary bottom enclosure having a first group of conductive regions adjacent to a second group of conductive regions according to an exemplary embodiment of the present disclosure. As illustrated in FIG. 7A, a bottom enclosure 700 includes a first group of conductive regions 702.1 through 702.n that are adjacent to a second group of conductive regions 704.1 through 704.m that are formed onto and/or within a base enclosure 706. The base enclosure 706 can be constructed of one or more elements, compounds, or alloys of one or more metals, such as aluminum, copper, zinc, gold, tin, and/or silver to provide some examples, one or more synthetic or semi-synthetic organic compounds or materials, also referred to as plastic, and/or any combination thereof to provide some examples. The bottom enclosure 700 can represent an exemplary embodiment of the first enclosure 302.

The first group of conductive regions 702.1 through 702.n and the second group of conductive regions 704.1 through 704.m are configured to be regular closed geometric structures, such as rectangles to provide an example. However, the first group of conductive regions 702.1 through 702.n and the second group of conductive regions 704.1 through 704.m can be implemented using other regular closed geometric structures, one or more irregular closed structures, such as one or more irregular polygons to provide an example, and/or any suitable combination of closed structures that will be apparent to those skilled in the relevant art(s). Although the first group of conductive regions 702.1 through 702.n and the second group of conductive regions 704.1 through 704.m as illustrated in FIG. 7A have substantially similar dimensions, those skilled in the relevant art(s) will recognize that other dimensions, whether similar or dissimilar, are possible.

As additionally illustrated in FIG. 7A, the first group of conductive regions 702.1 through 702.n and the second group of conductive regions 704.1 through 704.m are arranged in a series of rows and columns to form a matrix. However, this example is not limiting, those skilled in the relevant art(s) will recognize that other arrangements for the first group of conductive regions 702.1 through 702.n and the second group of conductive regions 704.1 through 704.m are possible without departing from the spirit and scope of the present disclosure.

FIG. 7B further illustrates the exemplary bottom enclosure according to an exemplary embodiment of the present disclosure. As illustrated in FIG. 7A, the line A-A traverses through a first row of the first group of conductive regions 702.1 through 702.n and the second group of conductive regions 704.1 through 704.m. As illustrated in FIG. 7B, a height of the first group of conductive regions 702.1 through 702.k along the first row is greater than a height of the second group of conductive regions 704.1 through 704.j along the first row.

When a magnetic field contacts, or is sufficiently proximate to, the bottom enclosure 700, the magnetic field induces one or more eddy currents that flow in one or more closed loops around surfaces of the first group of conductive regions 702.1 through 702.n. The difference in height between the first group of conductive regions 702.1 through 702.n and the second group of conductive regions 704.1 through 704.m confine the one or more eddy currents to first group of conductive regions 702.1 through 702.n. The magnetic fields generated by the one or more eddy currents are weaker than a magnetic field generated by eddy currents in a bottom enclosure constructed entirely of conductive material.

FIG. 8 illustrates an exemplary bottom enclosure having an integrated antenna according to an exemplary embodiment of the present disclosure. As illustrated in FIG. 8, a bottom enclosure 800 includes a first group of conductive regions 802.1 through 802.n that are adjacent to a second conductive region 804 that are formed onto and/or within a conductive region 806. The bottom enclosure 800 can represent an exemplary embodiment of the first enclosure 302.

The first group of conductive regions 802.1 through 802.n are configured to be regular closed geometric structures, such as rectangles to provide an example. However, the first group of conductive regions 802.1 through 802.n can be implemented using other regular closed geometric structures, one or more irregular closed structures, such as one or more irregular polygons to provide an example, and/or any suitable combination of closed structures that will be apparent to those skilled in the relevant art(s). Although some of the first group of conductive regions 802.1 through 802.n as illustrated in FIG. 8 have substantially similar dimensions, those skilled in the relevant art(s) will recognize that other dimensions, whether similar or dissimilar, are possible.

The first group of conductive regions 802.1 through 802.n can be configured and arranged to form an integrated antenna for a communication device, such as the communication device 100 to provide an example. In an exemplary embodiment, this integrated antenna can be used to transmit and/or receive information via a magnetic field. For example, when transmitting information, the communication device provides a modulated current through the first group of conductive regions 802.1 through 802.$n$ to generate a magnetic field. As another example, when receiving information, another communication device generates a magnetic field to induce a modulated current through the first group of conductive regions 802.1 through 802.$n$. In another exemplary embodiment, the first group of conductive regions 802.1 through 802.$n$ can be used by the communication device to derive and/or harvest power. For example, a transmitter device generates a magnetic field to induce a current through the first group of conductive regions 802.1 through 802.$n$. In this example, the communication device derives and/or harvests power from this current.

The second conductive region 804 can be implemented using any of the techniques described above in FIG. 3 through FIG. 7B. The second conductive region 804 can be configured to be a regular closed geometric structure, such as a rectangle to provide an example. However, the second conductive region 804 can be implemented using other regular closed geometric structures, one or more irregular closed structures, such as one or more irregular polygons to provide an example, and/or any suitable combination of closed structures that will be apparent to those skilled in the relevant art(s).

CONCLUSION

The following Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

For purposes of this discussion, the term "module" shall be understood to include at least one of software, firmware, and hardware (such as one or more circuits, microchips, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A mechanical bottom enclosure for a communication device, the mechanical bottom enclosure comprising:
   a non-conductive region of non-conductive material; and
   a plurality of non-overlapping, closed geometric structures, having a plurality of surfaces, formed of conductive material within or onto the non-conductive region, the plurality of non-overlapping, closed geometric structures being arranged in a series of rows and a series of columns to form a matrix, the series of rows and the series of columns being interdigitated with the non-conductive region,
   wherein the non-conductive region is configured to separate adjacent non-overlapping, closed geometric structures from among the plurality of non-overlapping, closed geometric structures, and
   wherein the plurality of non-overlapping, closed geometric structures is configured to confine a plurality of eddy currents, induced by a magnetic field being proximate to the mechanical bottom enclosure, to be within the plurality of surfaces of the plurality of non-overlapping, closed geometric structures.

2. The mechanical bottom enclosure of claim 1, wherein each of the plurality of non-overlapping, closed geometric structures is a regular closed geometric structure.

3. The mechanical bottom enclosure of claim 2, wherein the regular closed geometric structure is a rectangle.

4. The mechanical bottom enclosure of claim 1, wherein a first closed geometric structure from among the plurality of non-overlapping, closed geometric structures is separated from a second closed geometric structure from among the plurality of non-overlapping, closed geometric structures by a distance, and
   wherein the distance is selectively chosen such that the first closed geometric structure and the second closed geometric structure form a capacitor of a tuned circuit.

5. The mechanical bottom enclosure of claim 4, wherein the tuned circuit is configured to resonate at a frequency of a magnetic field that is used for near field communication (NFC) or wireless power transfer (WPT).

6. The mechanical bottom enclosure of claim 1, wherein the conductive material comprises:
   one or more elements, compounds, or alloys of one or more metals.

7. The mechanical bottom enclosure of claim 1, wherein the non-conductive material comprises:

one or more synthetic or semi-synthetic organic compounds or materials.

8. The mechanical bottom enclosure of claim 1, wherein the plurality of non-overlapping geometric structures is formed onto the non-conductive region, and further comprising:
a layer of natural or synthetic resin, formed onto the plurality of non-overlapping, closed geometric structures and the non-conductive region, configured to secure the plurality of non-overlapping, closed geometric structures to the non-conductive region.

9. The mechanical bottom enclosure of claim 1, wherein the mechanical bottom enclosure is configured to be attached to a mechanical top enclosure, the mechanical bottom enclosure and the mechanical top enclosure being configured to contain electrical, mechanical, and/or electromechanical components of the communication device.

10. The mechanical bottom enclosure of claim 1, wherein the non-conductive region separates a first closed geometric structure from among the plurality of non-overlapping, closed geometric structures in a row from among the series of rows from a second closed geometric structure from among the plurality of non-overlapping, closed geometric structures in the row and a third closed geometric structure from among the plurality of non-overlapping, closed geometric structures in a column from a fourth closed geometric structure from among the plurality of non-overlapping, closed geometric structures in the column.

11. A communication device, comprising:
a touch-screen display;
one or more semiconductor substrates and/or printed circuit boards having a near field communication (NFC) module or a wireless power transfer (WPT) module; and
a mechanical chassis having a top enclosure and a bottom enclosure, the top enclosure and the bottom enclosure being configured to contain the touch-screen display and the one or more semiconductor substrates and/or printed circuit boards,
wherein the bottom enclosure comprises:
a non-conductive region of non-conductive material; and
a plurality of closed geometric structures formed of conductive material,
wherein the non-conductive region is configured to confine a plurality of eddy currents induced by a magnetic field to be within a plurality of surfaces of the plurality of closed geometric structures,
wherein a first closed geometric structure from among the plurality of closed geometric structures is separated from a second closed geometric structure from among the plurality of closed geometric structures to form a capacitor of a tuned circuit, the tuned circuit being configured to resonate at a frequency of the magnetic field that is used by the NFC module or the WPT module, and
wherein the tuned circuit is configured to resonate at the frequency of the magnetic field to amplify the magnetic field when the magnetic field contacts, or is sufficiently proximate to, the bottom enclosure.

12. The communication device of claim 11, wherein the plurality of closed geometric structures is arranged in a series of rows and a series of columns to form a matrix, and
wherein the non-conductive region is configured to separate adjacent closed geometric structures from among the plurality of closed geometric structures.

13. The communication device of claim 11, wherein the first closed geometric structure is configured to be concentric to the second closed geometric structure and to be separated from the second closed geometric structure by the non-conductive region.

14. The communication device of claim 11, wherein the plurality of closed geometric structures is arranged in a series of rows, each of the series of rows being separated from each other by the non-conductive region.

15. The communication device of claim 11, wherein a first group of closed geometric structures from among the plurality of closed geometric structures is configured to be used as an antenna by the NFC module or the WPT module.

16. The communication device of claim 15, wherein a second group of closed geometric structures from among the plurality of closed geometric structures comprises:
the first closed geometric structure and the second closed geometric structure.

* * * * *